Nov. 25, 1952 — W. E. RENICK — 2,619,111
RELIEF VALVE
Filed March 28, 1947

INVENTOR.
WENDELL E. RENICK
BY
Herschel C. Omohundro
Attorney

Patented Nov. 25, 1952

2,619,111

UNITED STATES PATENT OFFICE 2,619,111

RELIEF VALVE

Wendell E. Renick, Grove City, Ohio, assignor to The Denison Engineering Company, Columbus, Ohio, a corporation of Ohio Application March 28, 1947, Serial No. 737,984

9 Claims. (Cl. 137—489)

This invention relates generally to hydraulic apparatus and is particularly directed to a relief valve for use in hydraulic systems to prevent the pressure in such systems from exceeding a predetermined maximum.

An object of this invention is to provide a hydraulic device having a valve member and a pressure responsive piston for controlling the operation of the valve member, means being provided to change the effective area of one end of the piston whereby the areas at opposite ends thereof exposed to fluid pressure will be brought to a predetermined ratio most effective in the operation of the device.

Another object is to provide a device of the character mentioned in the preceding paragraph which will be simpler to manufacture through the elimination of problems of precise machining heretofore encountered in making devices of the usual construction for performing similar functions.

A further object of the invention is to provide a relief valve having a piston chamber, an outlet valve seat, a valve for engaging the seat, and a piston for actuating such valve, the area of one end of the piston being reduced by the cross-section area of the valve and further providing a member for reducing the effective area of the opposite end of the piston whereby similar fluid pressures at the opposite ends of the piston will tend to move the piston and the valve in a desired direction with a predetermined force.

A still further object is to provide a relief valve having a body with a piston chamber, a cover for closing the chamber, an outlet valve seat at the end of the chamber opposite the end closed by the cover, a valve for engaging the valve seat and a piston slidable in the chamber to effect the operation of the valve in response to pressure variations in the chamber, the relief valve being further provided with a balancing piston which reduces the effective area of the first piston at the end opposite the valve whereby the opposite end areas of the first piston will be substantially equal, a particular construction of balancing piston being employed to eliminate projections from the main piston into the main cover and the attendant problems of precise grinding to secure concentricity in the manufacture of the various parts of the valve.

Another object is to provide a relief valve of the type having a piston actuated valve element which reduces the effective area of the piston at one end, with means for reducing the area of the piston at the opposite end to substantially balance the effective end areas of the piston, the means for reducing the area at the end opposite the valve including an auxiliary piston which is telescopically received by the first piston and is maintained in engagement with the end wall of the chamber of the piston by combined spring force and fluid pressure, suitable sealing means being provided in connection with the auxiliary piston to prevent the escape of fluid pressure between the auxiliary piston and the chamber wall with which it is engaged, this arrangement permitting sufficient relative lateral movement of the piston and the end wall to insure the elimination of any tendency of the pistons to stick or bind.

Another object of the invention is to provide a pressure relief valve having a body with a piston chamber and an outlet separated by a valve seat, a valve for engaging the seat, and a pressure responsive piston for actuating the valve; to provide an auxiliary piston in the valve actuating piston to substantially balance the reduction in area of the piston caused by the valve; to provide resilient means between the valve and the auxiliary piston for urging the latter toward the end wall and the valve toward the seat; to provide a connecting passage between the interior of the valve-actuating piston and the outlet; and, to provide sealing means to prevent flow of fluid pressure from the piston chamber around the auxiliary piston to the interior of the valve actuating piston whereby the relief valve will be maintained in efficient operating condition.

Other objects and advantages of the present invention will be apparent from the following description, reference being had to the accompanying drawings wherein a preferred form of embodiment of the invention is clearly shown.

Figure 1:
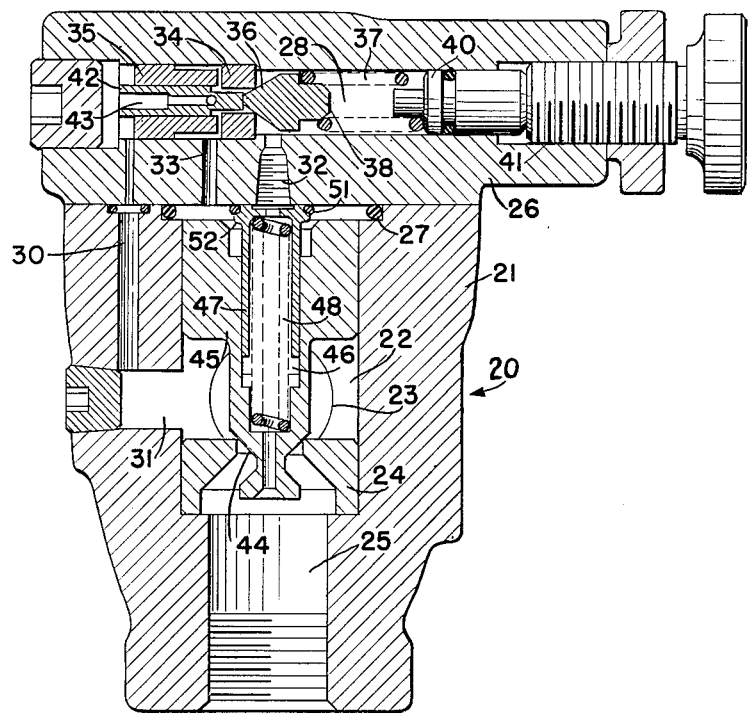
Fig. 1 is a vertical transverse sectional view taken through a relief valve formed in accordance with the present invention.
Figure 2:
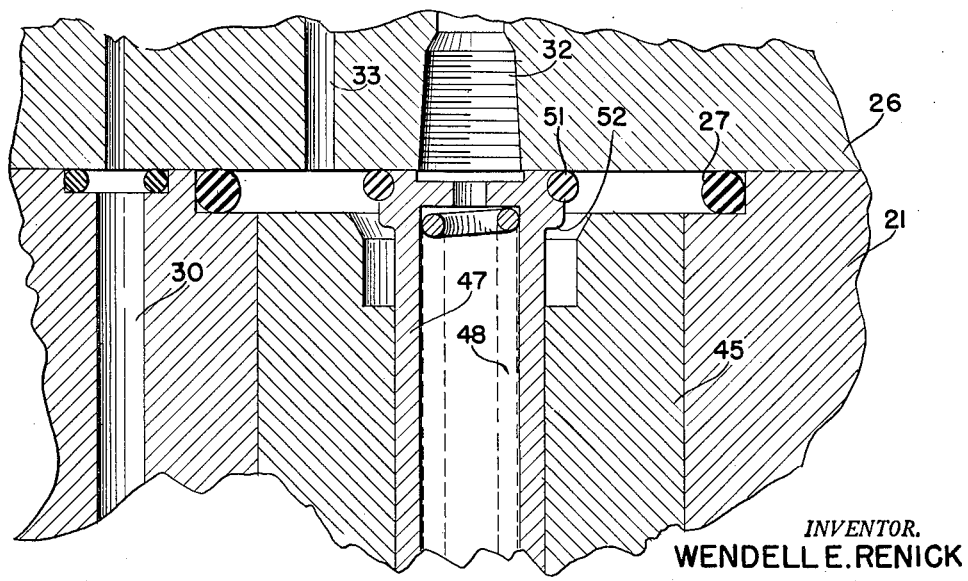
Fig. 2 is a detailed sectional view on an enlarged scale of a portion of the valve to which the invention is applied.

Referring more particularly to the drawings, the numeral 29 designates the completed valve. This valve has also been disclosed and parts thereof claimed in my copending applications Serial Nos. 737,983 and 737,985, filed March 28, 1947, the first of which now bears Patent No. 2,580,128 and the second of which now bears Patent No. 2,608,-214. This valve includes a body 21 which is provided with an internal chamber 22 and one or more inlet ports 23 which communicate with the chamber. At one end of the chamber the body is provided with a seat insert 24 which separates the chamber from an outlet port 25. The upper end of the body 21 has a cover member 26 secured thereto to close the open upper end of the chamber 22, a suitable gasket 27 being employed around the edge of the chamber to prevent the escape of fluid pressure. Cover 26 has a bore 28 formed therein to establish communication between a vertical passage 30 which is connected at its lower end by a horizontal passage 31 with the chamber 22 and a second vertical passage 32 extending to the bottom wall of the cover 26 in registration with the chamber 22. Bore 28 also connects the upper ends of passages 30 and 32 with a third vertical passage 33, passages 32 and 33 being separated by a second valve seat insert 34. Passages 30 and 33 are separated by a guide member 35, valve seat insert 34 and guide 35 being disposed in bore 28.

Valve seat 34 is engaged by a cone-pointed valve 36 which is urged toward the seat by a coil spring 37 disposed between the back end of the valve and a spring abutment 40, this member being in turn engaged by an adjusting screw 41 threadedly received by the cover member 26 at one end of the bore 28.

Guide 35 receives a piston 42 which serves in the operation of the valve to assist in moving the valve 36 away from its seat. This piston has a restricted passage 43 formed therein to establish limited communication between the sections of the bore 28 at opposite ends of the guide 35; this restricted passage also provides for a pressure drop between opposite ends of the piston when fluid is permitted to flow past valve 36 beyond a predetermined rate. The mechanism just described forms the subject matter of my copending application Serial No. 737,983, filed March 28, 1947, now Patent No. 2,580,128.

Seat 24 is engaged by a poppet valve element 44 which is integrally formed with a piston member 45, this member being received for sliding movement in the chamber 22. Piston 45 is formed with a central socket 46 open at its upper end to slidably receive an auxiliary piston 47, this piston being hollow for the reception of one end portion of a coil spring 48, the opposite end portion of this spring being received in the reduced extension of the socket 46. Due to the provision of the spring 48, the pistons will tend to move in opposite directions causing valve 44 to engage the valve seat and piston 47 to engage the bottom wall of the cover 26. Piston 47 engages the under side of the cover 26 in approximate registration with the passage 32, the hollow interiors of pistons 47 and 45 serving as a continuation of the passage 32 to connect bore 28 with the outlet port 25.

When fluid is introduced to chamber 22 through inlet port 23, some of this fluid will flow upwardly through passage 30 to the end of bore 28 and through passage 43 in piston 42 to the section of bore 28 between guide 35 and seat 34; this fluid will flow through passage 33 to the section of the chamber 22 above piston 45. This fluid is prevented from flowing between the end of auxiliary piston 47 and the under side of the cover 26 by an O ring gasket 51 disposed in a groove extending around the end of piston 47 adjacent the cover 26. The groove is formed in the piston 47 in such manner that the gasket will project slightly beyond the end wall of the piston and engage the bottom wall of the cover firmly enough to prevent fluid flow therebetween. The groove is also so formed that fluid pressure in the chamber 22 above piston 45 will tend to compress the gasket to effect a good seal. To assist in maintaining the piston in engagement with the cover 26, the upper end of the piston is provided with an external flange 52 for engagement by the fluid under pressure in the chamber, such fluid pressure tending to urge the piston in an upward direction and maintain the engagement thereof with the cover.

In the operation of the valve, assuming the system to be charged with hydraulic fluid, the fluid pressure will increase in chamber 22 as the system pump, not shown, continues in operation. As the pressure builds up in the lower portion of chamber 22 it will similarly increase in the upper portion thereof due to the communication established between these portions of the chamber through passages 30, 28, 43, and 33 so that the pressures on opposite ends of piston 45 will be substantially equal. In the manufacture of this valve it has been determined that the diameter of the auxiliary piston 47 should be slightly smaller than the diameter of the opening in seat 24 so that the effective area at the upper end of piston 45 will be slightly greater than that at the lower end of the piston. This greater area, being engaged by the fluid pressure, causes a downward force on the piston 45 which will maintain the valve 44 in engagement with the seat 24. It will be noted that due to the equal pressures in the sections of bore 28 at opposite ends of the piston 42 there will be no tendency at this time for this piston to move in either direction. The opening in the second valve seat 34 is slightly smaller in diameter than the opening for piston 42. As the pressure in the system increases, this pressure will tend to force valve 36 away from its seat and when the pressure becomes sufficiently high, fluid will commence to flow from the space in bore 28 between guide 35 and seat 34 to the space on the other side of the seat 34, this fluid being exhausted through passage 32, the interiors of pistons 47 and 45 to the outlet port 25. When this flow exceeds the volume which may flow through the restricted passage 43, the fluid pressure between guide 35 and valve seat 34 will fall causing a differential in pressure between the ends of piston 42. This piston will be moved by such differential toward the valve 36 forcing the same a further distance from the seat 34. When valve 36 is moved in this manner an outlet is provided for fluid from the upper end of the chamber 22 and fluid pressure in the lower end of this chamber will cause piston 45 to move upwardly and effect the opening of valve 44. Fluid pressure in chamber 22 may then escape directly to the outlet 25. Fluid flowing past valve seat 24 flows around a head formed on the lower end of valve 44; this head is so shaped that the force of the fluid will be expended and the fluid pressure dissipated so that fluid will flow to exhaust in a solid stream devoid of foam or entrained air or gas. The formation of this head and the adjoining portions of the valve form the subject matter of my copending application Serial No. 737,985, filed on March 28, 1947, now Patent No. 2,608,214, and reference may be had to this patent for a more detailed description of this mechanism.

When the fluid pressure in chamber 22 lowers sufficiently the force tending to move piston 42 and valve 36 toward open position will be reduced and spring 37 may then force valve 36 back into engagement with seat 34. This action will close the outlet from the upper end of chamber 22 and fluid pressure therein will quickly build up to the same pressure obtaining in the lower end of this chamber. As these pressures approach the equalization point, spring 48 and the fluid pressure above piston 45 will cause the same to move downwardly to effect the closing of valve 44. This valve operation is set forth in an application, Serial No. 737,983; executed and filed on even date herewith, now Patent No. 2,580,128.

It will be noted that since piston 47 has no positive connection with the cover section 26 a slight eccentricity of the socket in the piston 45 will have no effect on the operation of the device. By providing the auxiliary piston and locating the same in the main piston a projection on the main piston, which would enter a socket in the cover section, is eliminated. With the elimination of this structure the attendant concentricity problem in the manufacture of these parts is also avoided.

I claim:

1. In a pressure relief valve, a body member having a cylindrical chamber and inlet and outlet ports connected therewith; a valve seat disposed in said body between said chamber and said outlet port; a valve for cooperation with said seat to control fluid flow from said chamber to said outlet port; a piston member formed with said valve and disposed for movement in said chamber; passage means in one of said members to establish communication between the portions of the chamber at opposite ends of said piston; a balancing piston for substantially equalizing the pressure engaged end areas of the first mentioned piston disposed for sliding movement in said first-mentioned piston; and yieldable means for maintaining said balancing piston in fluid-tight movable engagement with the end of said chamber, such engagement preventing the application of fluid at chamber pressure to the end of said balancing piston.

2. In a pressure relief valve, a body having a cylindrical chamber and inlet and outlet ports connected therewith; a valve seat disposed in said body between said chamber and said outlet port; a valve for cooperation with said seat to control fluid flow from said chamber to said outlet port; a piston formed with said valve and disposed for movement in said chamber; passage means establishing communication between the portions of the chamber at opposite ends of said piston; a balancing piston of slightly smaller diameter than said seat disposed for sliding movement in said first-mentioned piston; spring means between said pistons, said spring means tending to urge said valve toward said seat and said balancing piston into engagement with the end of said chamber; means establishing communication between the end of said balancing piston engaging said chamber end and exhaust; and means for preventing fluid flow between the engaged ends of said chamber and said balancing piston.

3. In a pressure relief valve, a body having a cylindrical chamber and inlet and outlet ports connected therewith; a valve seat disposed in said body between said chamber and said outlet port; a valve for cooperation with said seat to control fluid flow from said chamber to said outlet port; a piston formed with said valve and disposed for movement in said chamber; passage means connecting the ends of said chamber to substantially equalize pressures at opposite ends of said piston; a balancing piston disposed for sliding movement in said first-mentioned piston; a wall at the end of said chamber, the end of said balancing piston engaging said wall and being exposed to outlet port pressure, said balancing piston having a surface area exposed to the pressure in said chamber which tends to maintain the engagement of said balancing piston with the chamber end wall; and sealing means at the end of said piston adjacent the chamber end wall to prevent the flow of fluid between said piston and said wall.

4. In hydraulic apparatus, a body having a cylindrical chamber with an inlet for fluid pressure and an outlet port at one end; a valve seat surrounding said outlet port; a piston valve movable to and from said seat to control fluid flow through said port; passage means for establishing communication between the portions of the chamber at opposite ends of the piston of said valve; a balancing piston disposed in said piston valve, said balancing piston engaging the wall of said chamber at the end opposite said seat and being substantially equal in area to the area of said valve seat; means resiliently urging said piston valve toward said seat and said balancing piston toward the end wall; and means for exposing the end of said balancing piston in engagement with said chamber end wall to outlet port pressure.

5. In hydraulic apparatus, a body forming a chamber having a smooth flat wall at one end, said chamber having a fluid pressure inlet; a valve seat at the opposite end of said chamber, said valve seat surrounding a fluid outlet port; a second body having a piston section slidably received by said chamber and a valve section for cooperation with said seat to control fluid flow from said chamber; passage means establishing communication between the chamber portions at opposite ends of piston section; a balancing piston movably disposed in said second body; an area on said balancing piston exposed to the pressure of fluid in said chamber to urge one end of said balancing piston in engagement with the flat end wall of said chamber; and passage means for exposing said one end of said balancing piston to fluid at outlet port pressure.

6. In a pressure relief valve, a body having a cylindrical chamber with inlet and outlet ports; a valve seat between said ports; a piston valve disposed for sliding movement in said chamber to control communication between said inlet and outlet ports, a portion of said valve being exposed to the outlet port pressure; passage means establishing communication between the portions of said chamber at opposite ends of the piston of said valve; means for balancing the areas of the piston exposed to inlet port pressure comprising a balancing piston disposed for sliding movement in the first-mentioned piston, the cross sectional area of said balancing piston being substantially equal to the area of said valve exposed to outlet port pressure; passage means for applying fluid at outlet port pressure to one end of said balancing piston; and means tending to move said balancing piston to maintain said one end thereof in engagement with an end wall of said chamber.

7. In a relief valve of the type having a casing with an inlet for fluid pressure, an outlet and a piston valve exposed at opposite ends to inlet pressure for controlling fluid flow between said inlet and outlet, said piston valve having a portion exposed to outlet port pressure; means for reducing the area on one side of the piston of said piston valve exposed to inlet port pressure to substantially balance the areas exposed to inlet port pressure, said means having a balancing piston received for relative movement in the piston valve, said balancing piston having a cross sectional area substantially equal to the area of the portion of said piston valve exposed to outlet pressure, one end of said balancing piston being exposed to outlet pressure and sealed against communication with the inlet; and an area on said balancing piston exposed to inlet port pressure to urge said one end into abutting relationship with the valve casing, said balancing piston being free to move laterally relative to said casing.

8. In hydraulic apparatus, a body having a cylindrical chamber with a fluid pressure inlet port and an outlet port at one end, the opposite end of said chamber being smooth and flat; a valve seat surrounding said outlet port; a piston valve movable in said chamber to control fluid flow through said port; passage means exposing the opposite ends of the piston of said valve to inlet port pressure; a balancing piston movably disposed in said piston valve, one end of said balancing piston engaging said flat end wall, said one end of such balancing piston being exposed to outlet port pressure; and means yieldably urging said pistons in opposite directions to maintain said valve in engagement with said seat and said balancing piston in engagement with the chamber end wall.

9. In a hydraulic valve mechanism, a casing having a chamber with an inlet and an outlet; a valve seat between said inlet and outlet; a piston valve disposed for movement in said chamber toward and away from said valve seat; a second piston telescoping the first-mentioned piston from the side opposite said seat to substantially balance the end areas of said piston exposed to pressure; a flange on said second piston, fluid pressure on said flange tending to move said second piston outwardly from the first-mentioned piston and into engagement with said casing; and a seal member between said second piston and said casing to prevent the flow of fluid pressure between the end of said second piston and said casing.

WENDELL E. RENICK.

REFERENCES CITED

The following references are of record in the file of this patent:

UNITED STATES PATENTS

| Number | Name | Date |
|---|---|---|
| 478,949 | Beery | July 12, 1892 |
| 1,110,567 | McAulay | Sept. 15, 1914 |
| 1,207,436 | Ohlsen | Dec. 5, 1916 |
| 2,308,753 | Hart | Jan. 19, 1943 |
| 2,317,332 | Rappl | Apr. 20, 1943 |